US012696237B2

(12) United States Patent　　　　　(10) Patent No.:　US 12,696,237 B2
Agiwal et al.　　　　　　　　　　　　(45) Date of Patent:　　　Jul. 28, 2026

(54) METHOD AND APPARATUS FOR PAGING PROCEDURE IN WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/277,693

(22) PCT Filed: Feb. 24, 2022

(86) PCT No.: PCT/KR2022/002725
§ 371 (c)(1),
(2) Date: Aug. 17, 2023

(87) PCT Pub. No.: WO2022/182172
PCT Pub. Date: Sep. 1, 2022

(65) Prior Publication Data
US 2024/0137908 A1　　Apr. 25, 2024
US 2024/0236939 A9　　Jul. 11, 2024

(30) Foreign Application Priority Data

Feb. 26, 2021　(KR) ......................... 10-2021-0026170

(51) Int. Cl.
*H04W 68/02*　　　　(2009.01)
(52) U.S. Cl.
CPC .................................... *H04W 68/02* (2013.01)
(58) Field of Classification Search
CPC .................................................. H04W 68/02

USPC ......................................................... 455/458
See application file for complete search history.

(56) References Cited

U.S. PATENT DOCUMENTS 10,231,208 B2　3/2019　Agiwal et al.
2020/0275375 A1　8/2020　Liu et al.

FOREIGN PATENT DOCUMENTS

WO　　2020/216242 A1　10/2020

OTHER PUBLICATIONS

CATT; UE sub-grouping mechanism with Paging Enhancement; 3GPP TSG-RAN WG2 Meeting #113 electronic; R2-2100298; Online; Jan. 25, 2021-Feb. 5, 2021.
Samsung; Paging Enhancements—UE Grouping; 3GPP TSG-RAN2 Meeting #113 Electronic; R2-2100143; Jan. 25, 2021-Feb. 5, 2021.

(Continued)

*Primary Examiner* — Joel Ajayi
(74) *Attorney, Agent, or Firm* — Jefferson IP Law, LLP

(57)　　　　　　ABSTRACT

The disclosure relates to a 5G or 6G communication system for supporting a higher data transmission rate. A method performed by a user equipment (UE) in a wireless communication system is provided. The method may include: receiving, from a base station, paging early indication (PEI) configuration information including a parameter indicating a number of UE identity (ID) based paging subgroups; determining a paging subgroup ID corresponding to the UE, based on a maximum value of the parameter; monitoring PEI information on a PEI occasion, based on the PEI configuration information; and in case that the PEI information indicates the paging subgroup ID, monitoring paging downlink control information (DCI) on a paging occasion (PO).

15 Claims, 9 Drawing Sheets

(56)  References Cited

OTHER PUBLICATIONS

Vivo; Paging enhancements for idle/inactive mode UE power saving; 3GPP TSG RAN WG1#104-e; R1-2100452; e-Meeting; Jan. 25, 2021-Feb. 5, 2021.

International Search Report with Written Opinion dated Jun. 3, 2022; International Appln. No. PCT/KR2022/002725.

International Preliminary Report on Patentability dated May 10, 2023; International Appln. No. PCT/KR2022/002725.

【Figure 1】

| | PF1 | PF2 | PF3 | PF4 | | PF256 |
|------|------|------|------|------|------|------|
| PO1 | 0 | 1 | 2 | 3 | · · · · | 255 |
| PO2 | 256 | 257 | 258 | 259 | · · · · | 511 |
| PO3 | 512 | 513 | 514 | 515 | · · · · | 767 |
| PO4 | 768 | 769 | 770 | 771 | · · · · | 1023 |

Distribution of UEs to PE and PO
N = 256, Ns = 4

[Figure 2]
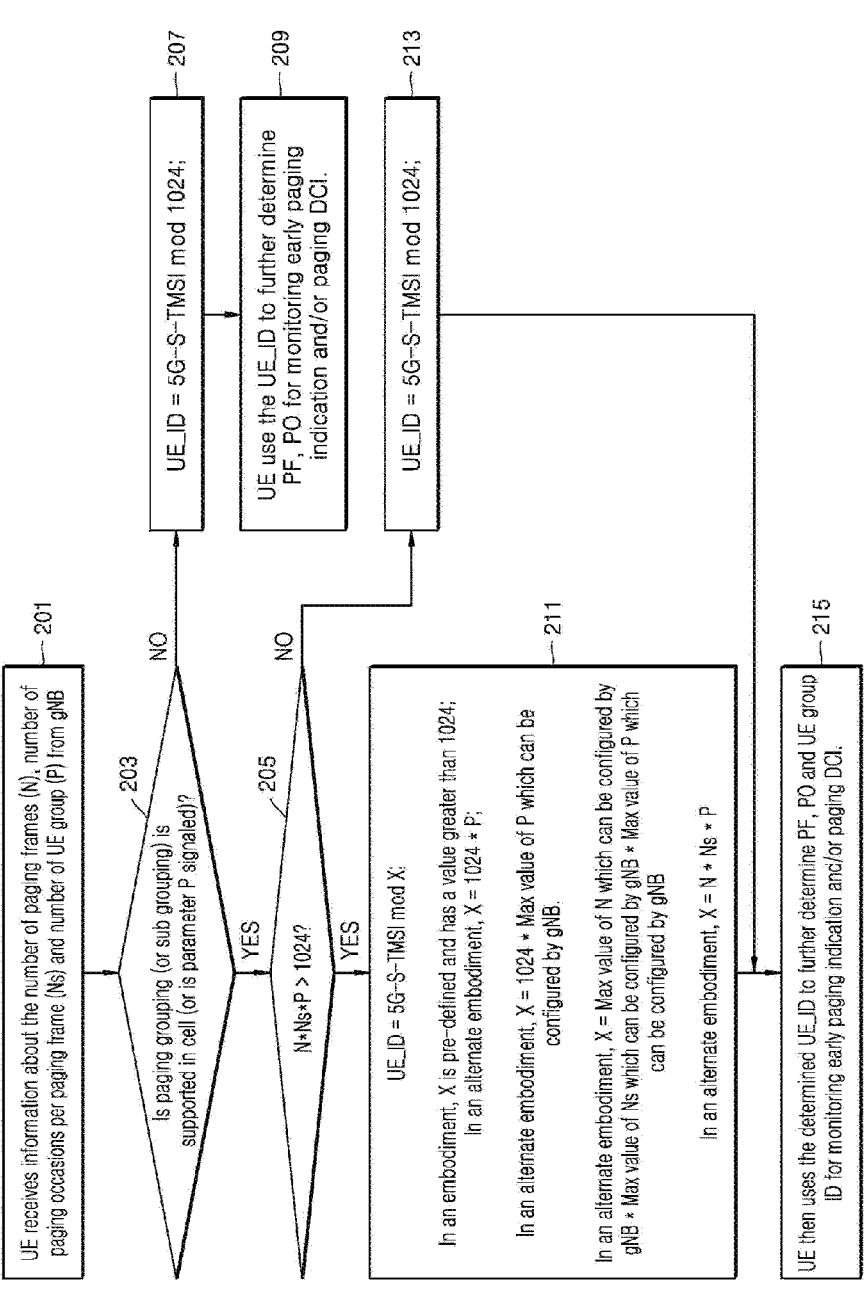

[Figure 3]
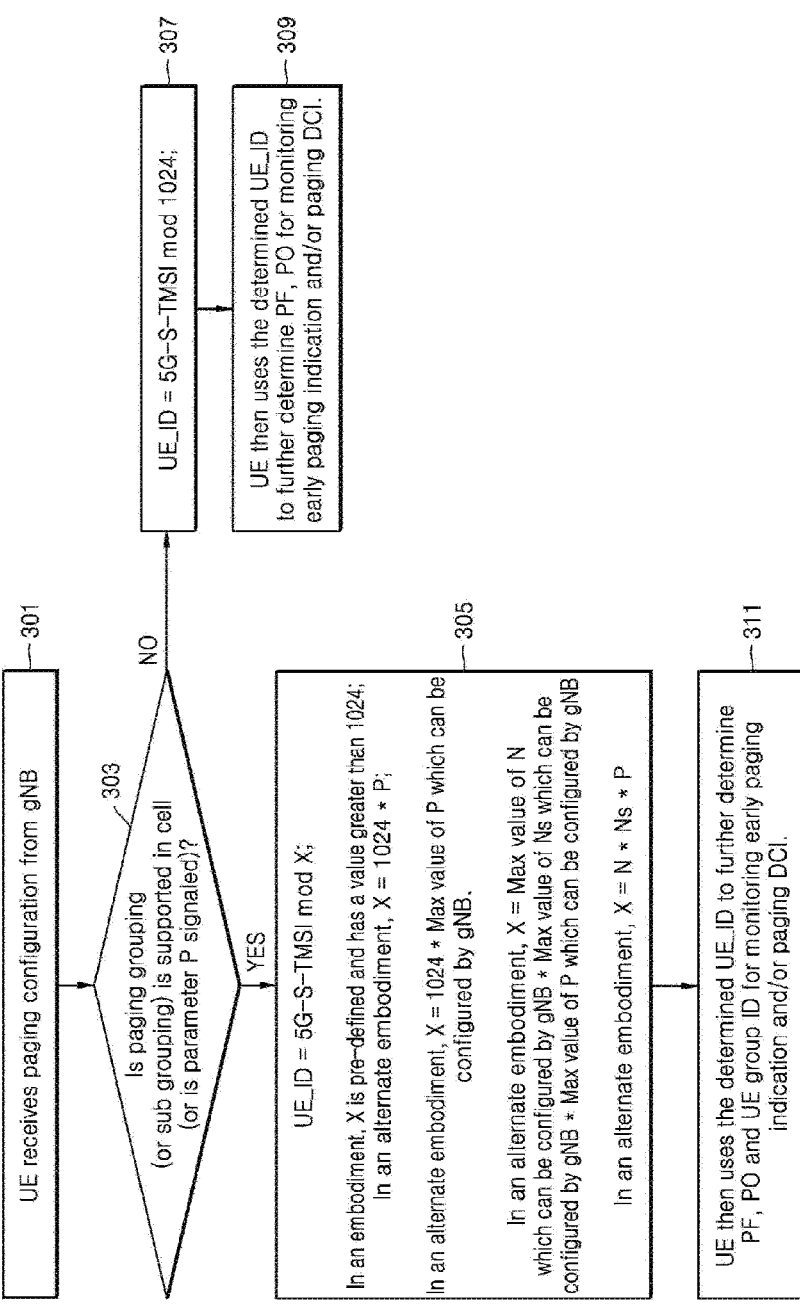

[Figure 4]
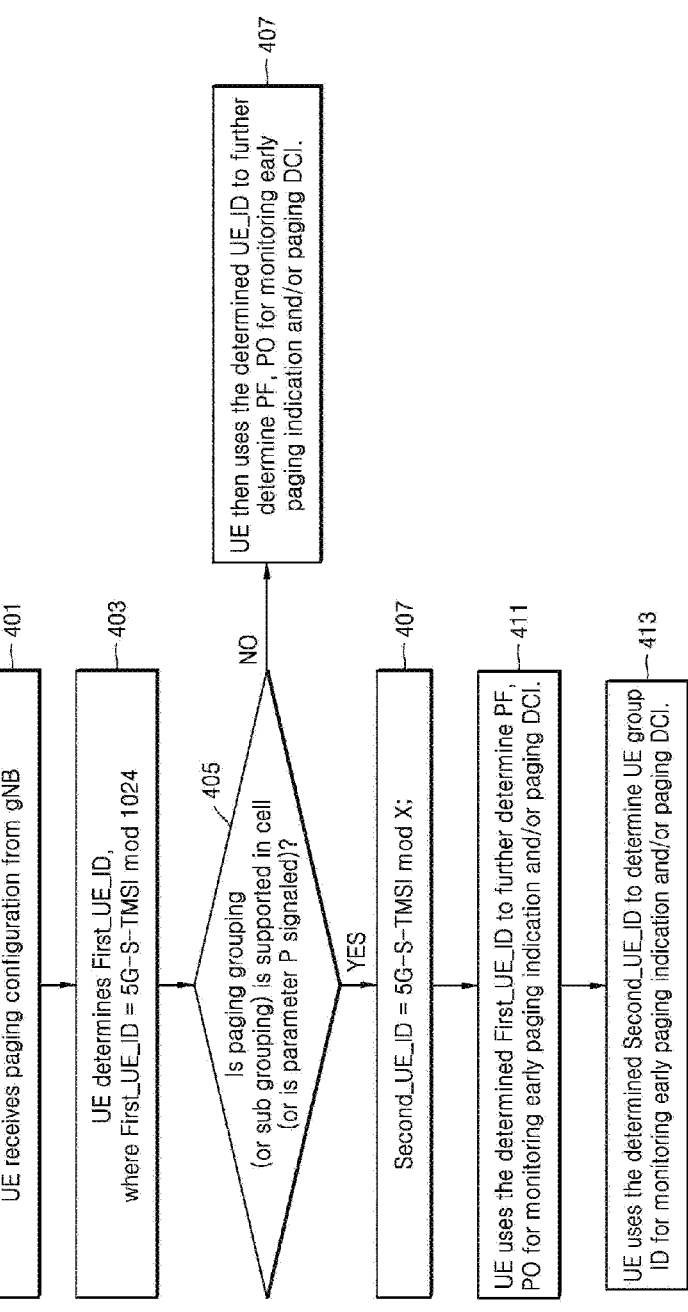

[Figure 5]
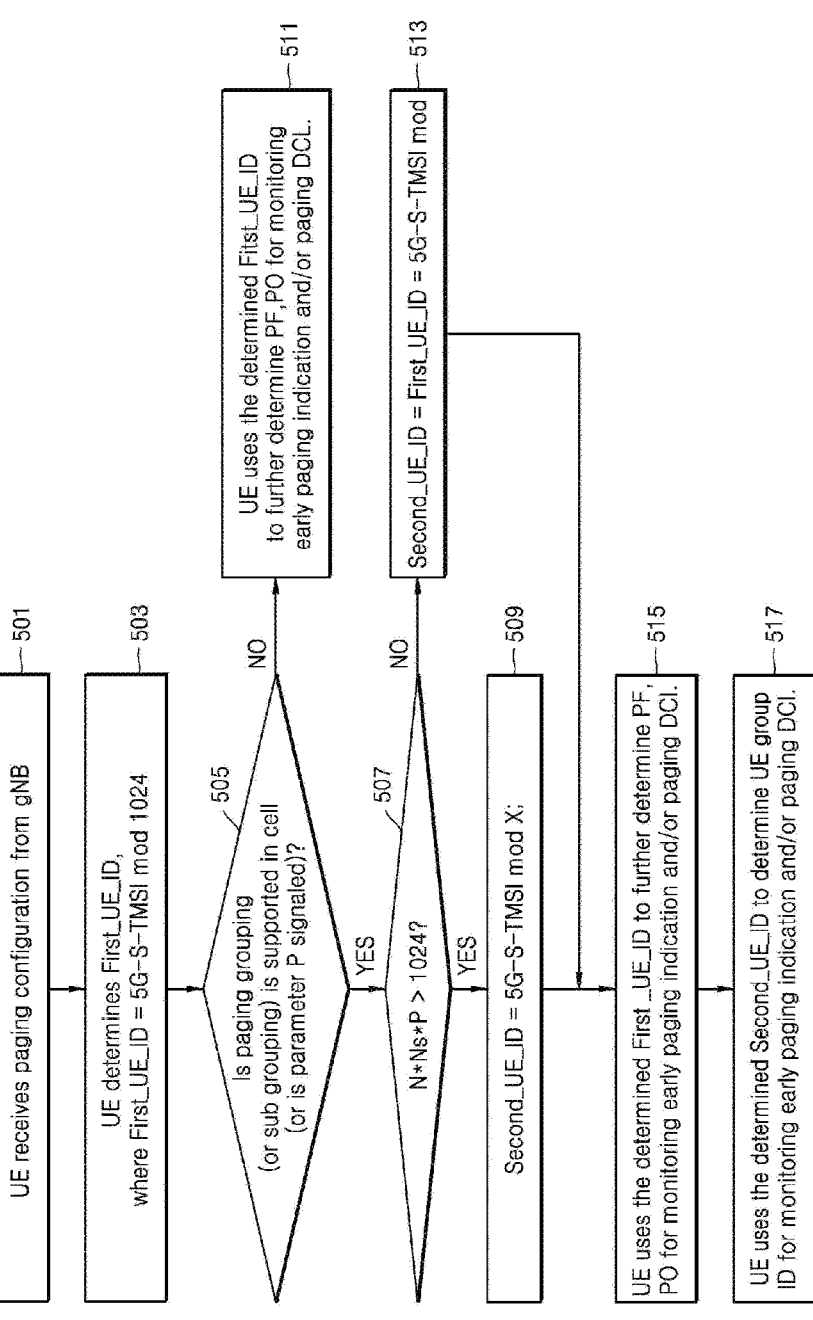

[Figure 6]

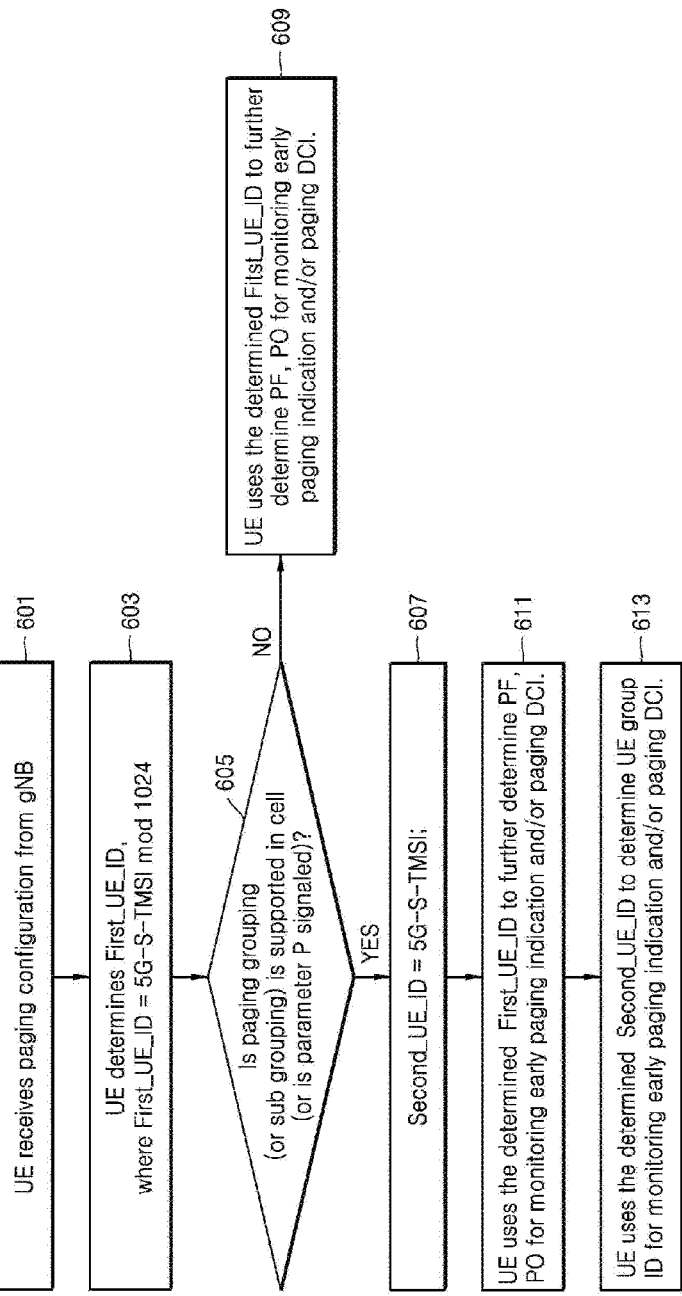

601 — UE receives paging configuration from gNB

603 — UE determines First_UE_ID, where First_UE_ID = 5G-S-TMSI mod 1024

605 — Is paging grouping (or sub grouping) is supported in cell (or is parameter P signaled)?

NO → 609 — UE uses the determined First_UE_ID to further determine PF, PO for monitoring early paging indication and/or paging DCI.

YES

607 — Second_UE_ID = 5G-S-TMSI;

611 — UE uses the determined First_UE_ID to further determine PF, PO for monitoring early paging indication and/or paging DCI.

613 — UE uses the determined Second_UE_ID to determine UE group ID for monitoring early paging indication and/or paging DCI.

[Figure 7]

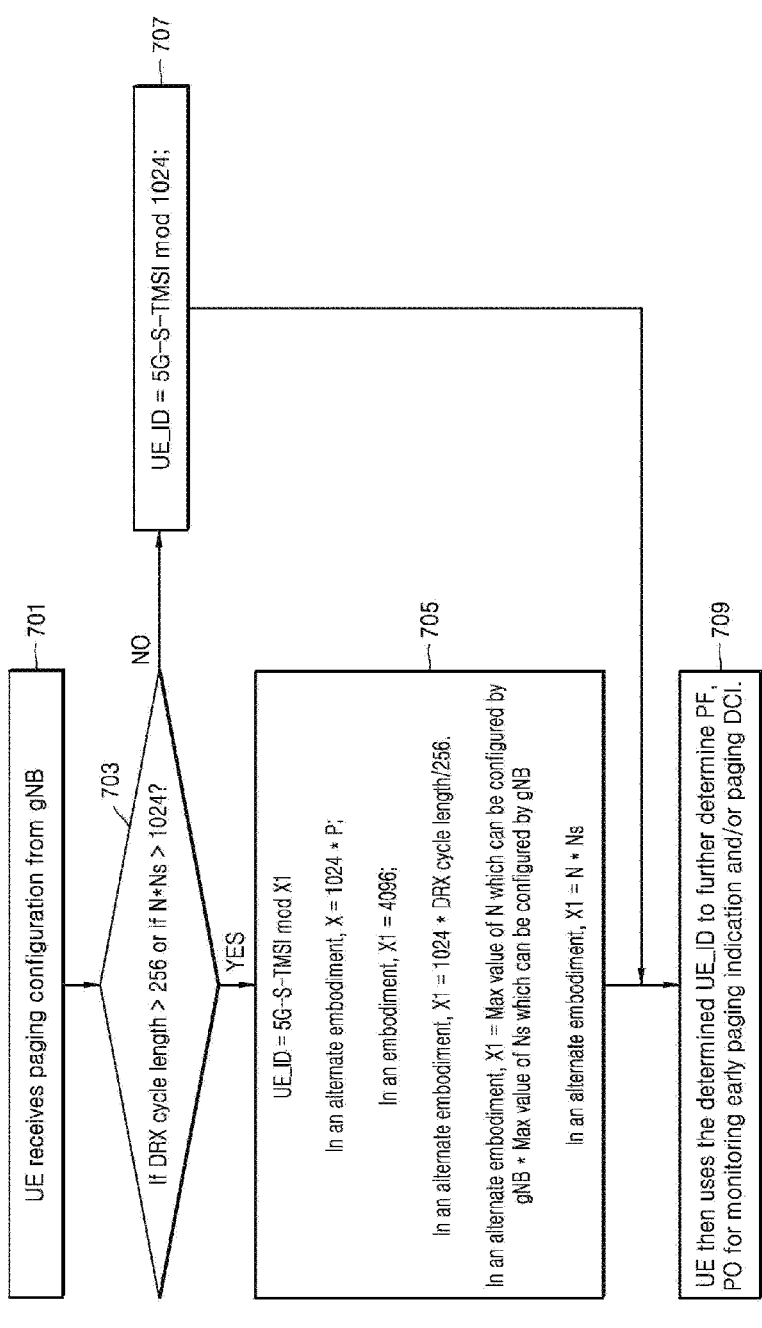

UE receives paging configuration from gNB — 701

703 — If DRX cycle length > 256 or if N*Ns > 1024?

NO → UE_ID = 5G-S-TMSI mod 1024; — 707

YES

705 — UE_ID = 5G-S-TMSI mod X1

In an alternate embodiment, X = 1024 * P;

In an embodiment, X1 = 4096;

In an alternate embodiment, X1 = 1024 * DRX cycle length/256.

In an alternate embodiment, X1 = Max value of N which can be configured by gNB * Max value of Ns which can be configured by gNB In an alternate embodiment, X1 = N * Ns UE then uses the determined UE_ID to further determine PF, PO for monitoring early paging indication and/or paging DCI. — 709

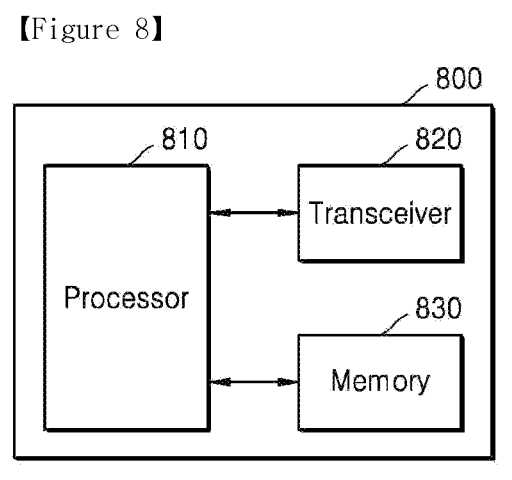

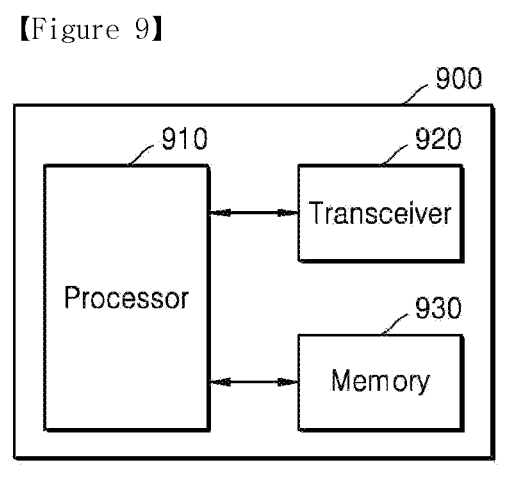

METHOD AND APPARATUS FOR PAGING PROCEDURE IN WIRELESS COMMUNICATION SYSTEM

TECHNICAL FIELD

The disclosure relates to wireless communication systems, and more particularly, to a method and an apparatus for a paging procedure in a wireless communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Solution to Problem

The disclosure relates to a method and an apparatus for a paging procedure in a wireless communication system.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 illustrates a table associated with distribution of UEs to PF and PO;

FIG. 2 illustrates a flow chart describing UE operation according to an embodiment of the disclosure;

FIG. 3 illustrates a flow chart describing UE operation according to an embodiment;

FIG. 4 illustrates a flow chart describing UE operation according to an embodiment;

FIG. 5 illustrates a flow chart describing UE operation according to an embodiment.

FIG. 6 illustrates a flow chart describing UE operation according to an embodiment;

FIG. 7 is illustrates a flow chart describing UE operation according to an embodiment.

FIG. 8 is a diagram illustrating a UE 800 according to an embodiment of the present disclosure; and FIG. 9 is a diagram illustrating a base station 900 according to an embodiment of the present disclosure.

MODE FOR THE INVENTION

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

In recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system, which is also referred as next generation radio (NR), is being developed to meet the growing demand for high speed data services by supporting ultra-reliability and low latency applications.

The fifth generation wireless communication system supports not only lower frequency bands but also higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc.

However, it is expected that the design of the air-interface of the fifth generation wireless communication system would be flexible enough to serve the UEs having quite different capabilities depending on the use case and market segment the UE caters service to the end customer. Few example use cases that the fifth generation wireless communication system is expected to address are enhanced Mobile Broadband (eMBB), massive Machine Type Communication (m-MTC), ultra-reliable low latency communication (URLL) and etc. The eMBB requirements like tens of Gbps data rate, low latency, high mobility and so forth address the market segment representing the conventional wireless broadband subscribers needing internet connectivity everywhere, all the time and on the go. The m-MTC requirements like very high connection density, infrequent data transmission, very long battery life, low mobility address and so forth address the market segment representing the Internet of Things (IoT)/Internet of Everything (IoE) envisioning connectivity of billions of devices. The URLL requirements like very low latency, very high reliability and variable mobility and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicate with each other using a beamforming. Beamforming techniques are used to mitigate the propagation path losses and to increase the propagation distance for a communication at higher frequency band. Beamforming enhances the transmission and reception performance using a high-gain antenna. Beamforming can be classified into Transmission (TX) beamforming performed in a transmitting end and reception (RX) beamforming performed in a receiving end.

In general, the TX beamforming increases a directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, and etc. The use of the TX beamforming results in the increase in the directivity of a signal, thereby increasing a propagation distance. Further, since the signal is almost not transmitted in a direction other than a directivity direction, a signal interference acting on another receiving end is significantly decreased.

The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make a plurality of transmit beam patterns of different directions. Each of these transmit beam patterns can be also referred as transmit (TX) beam. A wireless communication system operating at high frequency uses a plurality of narrow TX beams to transmit signals in a cell as each narrow TX beam provides coverage to a part of the cell. The narrower the TX beam, the higher the antenna gain and hence the larger the propagation distance of signal transmitted using beamforming. A receiver can also make a plurality of receive (RX) beam patterns of different directions. Each of these receive patterns can be also referred as receive (RX) beam.

CA/Multi-connectivity in fifth generation wireless communication system: The fifth generation wireless communication system supports a standalone mode of operation as well as dual connectivity (DC). In DC, multiple Rx/Tx UEs may be configured to utilise resources provided by two different nodes (or NBs) connected via a non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB).

In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

System information acquisition in fifth generation wireless communication system: In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource (s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformation-AreaID.

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs;

Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot})\mod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/ modification, beam failure recovery and data or control information transmission in UL by non-synchronized UE in RRC CONNECTED state. Several types of random access procedure is supported, such as 4 step contention based random access, 4 step contention free random access and 2 step contention based random access.

Paging in fifth generation wireless communication system: In the 5th generation (also referred as NR or New Radio) wireless communication system UE can be in one of the following RRC state: RRC IDLE, RRC INACTIVE and RRC CONNECTED. The RRC states can further be characterized as follows:

In RRC_IDLE state, a UE specific DRX may be configured by upper layers (i.e. NAS). The UE, monitors Short Messages transmitted with P-RNTI over DCI; Monitors a Paging channel for CN paging using 5G-S-TMSI;—Performs neighbouring cell measurements and cell (re-)selection; Acquires system information and can send SI request (if configured).

In RRC_INACTIVE state, a UE specific DRX may be configured by upper layers or by RRC layer; In this state, UE stores the UE Inactive AS context. A RAN-based notification area is configured by RRC layer. The UE monitors Short Messages transmitted with P-RNTI over DCI; Monitors a Paging channel for CN paging using 5G-S-TMSI and RAN paging using fullI-RNTI; Performs neighbouring cell measurements and cell (re-)selection; Performs RAN-based notification area updates periodically and when moving outside the configured RAN-based notification area; Acquires system information and can send SI request (if configured).

In the RRC_CONNECTED, the UE stores the AS context. Unicast data is transmitted/received to/from UE. At lower layers, the UE may be configured with a UE specific DRX. The UE, monitors Short Messages transmitted with P-RNTI over DCI, if configured; Monitors control channels associated with the shared data channel to determine if data is scheduled for it; Provides channel quality and feedback information; Performs neighbouring cell measurements and measurement reporting; Acquires system information.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In the 5th generation (also referred as NR or New Radio) wireless communication system, the UE may use Discontinuous Reception (DRX) in RRC_IDLE and RRC_I-NACTIVE state in order to reduce power consumption. In the RRC_IDLE/RRC_INACTIVE state UE wake ups at regular intervals (i.e. every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e. S-TMSI for RRC_IDLE UE or I-RNTI for RRC_INAC-TIVE UE) is included in paging message to indicate paging for a specific UE. Paging message may include multiple UE identities to page multiple UEs. Paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. In RRC connected state, UE can monitor any PO in paging DRX cycle and monitors at least one PO in SI modification period. In the RRC idle/inactive mode UE monitors PO every DRX cycle in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

The PF for a UE is the radio frame with system frame number 'SFN' which satisfies the equation (SFN+ PF_offset) mod $T = (T \text{ div } N)*(UE\_ID \text{ mod } N)$.

Index (i_s), indicating the index of the PO is determined by $i\_s = \text{floor}(UE\_ID/N) \text{ mod } Ns$.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasion-OfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformation-Block1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with CRC scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—

$$\lceil \log_2 N_{RB}^{DL,BWP}(N_{RB}^{DL,BWP}+1)/2 \rceil$$

bits. If only the short message is carried, this bit field is reserved.

$$N_{RB}^{DL,BWP}$$

is the size of CORESET 0

Time domain resource assignment—4 bits as defined in Subclause 5.1.2.1 of [6, TS38.214]. If only the short message is carried, this bit field is reserved.

VRB-to-PRB mapping—1 bit according to Table 7.3.1.1.2-33. If only the short message is carried, this bit field is reserved.

Modulation and coding scheme—5 bits as defined in Subclause 5.1.3 of [6, TS38.214], using Table 5.1.3.1-1. If only the short message is carried, this bit field is reserved.

TB scaling—2 bits as defined in Subclause 5.1.3.2 of [6, TS38.214]. If only the short message is carried, this bit field is reserved.

Reserved bits—6 bits

TABLE 1

| Short Message indicator | |
|---|---|
| Bit field | Short Message indicator |
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

| Short Message | |
|---|---|
| Bit | Short Message |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

Small data transmission in fifth generation wireless communication system: In 5G wireless communication system, small data transmission (SDT) in RRC_INACTIVE is supported. The uplink data can be transmitted in Msg3 in case of 4 step RA procedure and in MsgA in case of 2 step RA procedure.

Issues

In order to reduce UE power consumption in RRC_IDLE/RRC_INACTIVE state, early paging indication, which is also referred as PEI (paging early indication), can be transmitted before the paging occasion (PO). An early paging indication is a sequence or a PDCCH transmitted before the PO. If indicated by early paging indication (or early paging indication indicates paging group(s) or subgroup(s)), the UE may monitor the PDCCH addressed to paging-radio network temporary identifier (P-RNTI) in its paging occasion. If early paging indication is PDCCH based, the UE may monitor the PDCCH in a PDCCH monitoring occasion (PMO) of the early paging indication. The PMO of the early paging indication occurs before the PMO of PO. The UE may receive the PDCCH in the PMO of the early paging indication. The DCI of the received PDCCH may indicate one or more paging groups or sub groups for which there is a paging. The UE may determine a paging group or a subgroup of the UE, based on UE identity. Alternatively, the UE may be assigned a paging group or a subgroup by core network (CN). If the paging is there for a UE group, UE may monitor PO i.e. UE may monitor the PDCCH addressed to the P-RNTI in its PO. Alternately, one or more paging groups or subgroups for which there is a paging message, can be indicated by paging DCI i.e. PDCCH addressed to P-RNTI transmitted in PO. If paging group or subgroup is indicated in the paging DCI, the UE may receive and decode the PDSCH scheduled by the paging DCI to receive the paging message.

Paging group ID or subgroup ID of the UE is determined as follows:

UEs monitoring the same PO are divided into paging groups or subgroups. UE paging group ID or subgroup ID=(UE_ID/N*Ns) mod P, where N is the number of Paging frames, Ns is the number of POs per paging frame and P is the number of paging groups or subgroups based on UE identity. Parameters (N, Ns and P) are signaled by the gNB in a paging configuration. UE_ID=5G-S-TMSI mod 1024.

The maximum value of N, which can be configured by network (i.e. base station)=256. The maximum value of Ns, which can be configured by network (i.e. base station)=4 and P>1. As a result, when N*Ns*P>1024, all UEs of a PO will be get mapped to the same paging group or subgroup.

FIG. 1 illustrates a table associated with distribution of UEs to PF and PO.

For example, as shown in FIG. 1, for PO1 of PF1, all UEs with UE_ID 0 are mapped to the PO1. The formula for paging grouping or subgrouping will map all the UEs of the PO1 to the same paging group or subgroup i.e. paging group 0 or paging subgroup 0. So, enhancement is needed.

UE_ID for Paging Grouping or Subgrouping

Embodiment 1

FIG. 2 illustrates a flow chart describing UE operation according to an embodiment of the disclosure.

In step 201, the UE may receive information about the number of paging frames (N), number of paging occasions per paging frame (Ns) and number of paging groups or subgroups (P) based on UE identity from the gNB. This information can be received in SIB (e.g. SIB1) or in RRC signaling message (such as RRCReconfiguration message, or RRCRelease message).

In step 203, the UE may determine whether the paging grouping or the paging subgrouping based on UE identity is supported in the cell. In an embodiment, the UE may determine whether information associated with the parameter P is received from the gNB.

In an embodiment, it is assumed that the UE supports UE identity based paging grouping or subgrouping. It is also assumed that the UE is not assigned core network (CN) based paging group or subgroup or the camped cell does not support CN based paging subgrouping or grouping. If the UE identity based paging grouping or subgrouping is supported in a cell (or parameter P is signaled, where P is the number of UE identity based paging groups or subgroups), for monitoring paging using UE identity based paging grouping or subgrouping ('Yes' in step 203), the UE may determine the UE_ID as follows:

In step 205, the UE may check whether N*Ns*P is greater than 1024 or not, where '*' is a multiplication operator.

If N*Ns*P is greater than 1024 ('Yes' in step 205), in step 211, the UE may determine the UE_ID as follows.

UE_ID=5G-S-TMSI mod X.

In an embodiment, X is pre-defined and has a value greater than 1024;

In an alternate embodiment, X=1024*P.

In an alternate embodiment, X=1024*Max value of P which can be configured by the gNB. For example, if configurable values of P are 2, 4, 8 and 16, max value of P which can be configured by the gNB is 16 and X=1024*16. If configurable values of P are 1, 2, 3, 4, 5, 6, 7 and 8, maximum value of P which can be configured by the gNB is 8 and hence X=1024*8=8192. Note that the gNB may configure a value less than maximum value that can be configured but X is based on the maximum value i.e. X=1024*8=8192.

In an alternate embodiment, X=Max value of N which can be configured by the gNB*Max value of Ns which can be configured by the gNB*Max value of P which can be configured by the gNB.

In an alternate embodiment, X=N*Ns*P (here N, Ns and P are the values received from the gNB in the paging configuration).

If N*Ns*P is less than or equal to 1024 ('No' in step 205), in step 213, the UE may determine the UE_ID is determined as follows.

UE_ID=5G-S-TMSI mod 1024.

If the UE identity based paging grouping or subgrouping is not supported in the cell (or the parameter P is not signaled) ('No' in step 203), in step 207, the UE may determine the UE_ID as follows.

UE_ID=5G-S-TMSI mod 1024.

In step 209, the UE may use the UE_ID determined in step 207 to determine PF and PO for monitoring early paging indication or paging DCI.

In step 215, the UE then may use the determined UE_ID to further determine PF, PO and UE paging group or paging subgroup ID for monitoring early paging indication and/or paging DCI.

The PF for a UE is the radio frame with system frame number 'SFN' which satisfies the equation (SFN+PF_offset) mod T=(T div N)*(UE_ID mod N).

Index (i_s), indicating the index of the PO is determined by i_s=floor(UE_ID/N) mod Ns.

UE paging group or subgroup ID=(UE_ID/(N*Ns)) mod P

T is DRX cycle of the UE.

In RRC_INACTIVE state, T is determined by the shortest of the UE specific DRX value configured by the RRC, UE specific DRX value configured by non-access stratum (NAS), and a default DRX value broadcast in system information.

In RRC_IDLE state, T is determined by the shortest of UE specific DRX value configured by NAS, and a default DRX value broadcast in system information. If the UE specific DRX is not configured by upper layers (i.e. NAS), the default value is applied.

N: the number of total paging frames in T

Ns: the number of paging occasions for a PF

PF_offset: offset used for PF determination

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by the gNB.

When SearchSpaceId=0 is configured for paging-SearchSpace, the PDCCH monitoring occasions for paging are the same as for remaining minimum system information (RMSI). When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE may monitor the $(i\_s+1)^{th}$ PO. The PDCCH monitoring occasions for paging are determined based on paging search space configuration (paging-SearchSpace) signaled by the gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise (i.e. when the parameter firstPDCCH-MonitoringOccasionOfPO is not signalled by the gNB), the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformationBlock1 received from the gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If early paging indication is supported, UE may check whether its paging group or subgroup is indicated by early paging indication or not. If indicated, the UE may monitor paging DCI in its PO.

If the paging DCI indicates paging group(s) or subgroup(s), the UE may check whether its paging group or subgroup is indicated by the paging DCI or not. If UE paging group or subgroup is indicated in the paging DCI, the UE may receive and decode the PDSCH scheduled by the paging DCI to receive a paging message.

Note that similar method is also applied at the gNB side to determine PF/PO and paging group or subgroup ID of UE based on UE identity.

Embodiment 2

FIG. 3 illustrates a flow chart describing UE operation according to an embodiment.

In step 301, the UE may receive paging configuration information about the number of paging frames (N), number of paging occasions per paging frame (Ns) and number of paging groups or subgroups based on UE identity (P) from gNB. The paging configuration information can be received in SIB (e.g. SIB1) or in a RRC signaling message (such as RRCReconfiguration message, or RRCRelease message).

In this embodiment, it is assumed that the UE supports UE identity based paging grouping or subgrouping. It is also assumed that the UE is not assigned CN based paging group or subgroup or the camped cell does not support CN based paging grouping or subgrouping. In step 303, the UE may then check whether the UE identity based paging grouping (or paging sub grouping) is supported in the cell (or parameter P is signaled) or not. In an alternate embodiment, the UE may check whether the early paging indication is supported in the cell or not.

If the UE identity based paging grouping or subgrouping is supported in the cell (or the parameter P is signaled or the early paging indication is supported in the cell), for monitoring paging using the UE identity based paging grouping ('Yes' in step 303), in step 305, the UE may determine the UE_ID as follows:

UE_ID=5G-S-TMSI mod X;

In an embodiment, X is pre-defined and has a value greater than 1024.

In an alternate embodiment, X=1024*P.

In an alternate embodiment, X=1024*Max value of P which can be configured by the gNB. For example, if configurable values of P are 2, 4, 8, 16, max value of P which can be configured by gNB is 16 and X=1024*8=8192. Similarly, if max value of P which can be configured by gNB is 8, X=1024*8=8192. If configurable values of P are 1, 2, 3, 4, 5, 6, 7 and 8, maximum value of P which can be configured by the gNB is 8 and hence X=1024*8=8192. Note that the gNB may configure a value less than maximum value that can be configured but X is based on the maximum value i.e. X=1024*8=8192.

In an alternate embodiment, X=Max value of N which can be configured by the gNB*Max value of Ns which can be configured by the gNB*Max value of P which can be configured by the gNB.

In an alternate embodiment, X=N*Ns*P.

If the UE identity based paging grouping or subgrouping is not supported in the cell for monitoring paging using the UE identity based paging grouping or subgrouping ('No' in step 303), in step 307, the UE may determine the UE_ID as follows.

UE_ID=5G-S-TMSI mod 1024.

In step 309, the UE may use the UE_ID determined in step 307 to determine PF and PO for monitoring early paging indication or paging DCI.

In step 311, the UE may then use the determined UE_ID in step 305 to further determine PF, PO and paging group or subgroup ID or the UE for monitoring early paging indication and/or paging DCI.

The PF for a UE is the radio frame with system frame number 'SFN' which satisfies the equation (SFN+PF_offset) mod T=(T div N)*(UE_ID mod N).

Index (i_s), indicating the index of the PO is determined by $i\_s=floor(UE\_ID/N)$ mod Ns.

If UE identity based paging grouping or subgrouping is supported in cell (or parameter P is signaled), paging group or subgroup ID of the UE=$(UE\_ID/(N*Ns))$ mod P T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformationBlock1 received from gNB. The parameter firstPDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If early paging indication is supported, UE checks whether its paging group or subgroup is indicated by early paging indication or not. If indicated, UE monitors paging DCI in its PO.

If paging DCI indicates paging group(s) or subgroup(s), UE checks whether its paging group or subgroup is indicated by paging DCI or not. If paging group or subgroup of the UE is indicated in paging DCI, UE receives and decoded the PDSCH scheduled by paging DCI to receive paging message.

Note that similar method is also applied at the gNB side to determine PF/PO and paging group or subgroup ID of the UE based on UE identity.

Embodiment 3

FIG. 4 illustrations a flow chart illustrating UE operation according to an embodiment.

In step 401, the UE may receive paging configuration information about the number of paging frames (N), the number of paging occasions per paging frame (Ns) and the number of paging groups or subgroups based on UE identity (P) from the gNB. The paging configuration information can be received in SIB (e.g. SIB1) or in the RRC signaling message (such as RRCReconfiguration message, or RRCRelease message). In this embodiment, it is assumed that the UE supports UE identity based paging subgrouping or grouping. It is also assumed that the UE is not assigned CN based paging group or subgroup or the camped cell does not support CN based paging grouping or subgrouping.

In step 403, the UE may determine First_UE_ID, where First_UE_ID=5G-S-TMSI mod 1024.

In step 405, the UE may determine whether the UE identity based paging grouping (or paging sub grouping) is supported in the cell (or parameter P is signaled) or not. In an alternate embodiment, the UE may determine whether the early paging indication is supported in the cell or not.

If the UE identity based paging grouping or subgrouping is supported in the cell (or parameter P is signaled or in an alternate embodiment if early paging indication is supported in cell), for monitoring paging using UE identity based paging grouping or subgrouping ('Yes' in step 405), in step 407, the UE may determine second UE_ID as follows.

Second_UE_ID=5G-S-TMSI mod X.

In an embodiment, X is pre-defined and has a value greater than 1024.

In an alternate embodiment, X=1024*P.

In an alternate embodiment, X=1024*Max value of P which can be configured by the gNB. For example, if configurable values of P are 2, 4, 8, 16, max value of P which can be configured by gNB is 16 and X=1024*16. Similarly, if max value of P which can be configured by the gNB is 8, X=1024*8=8192. If configurable values of P are 1, 2, 3, 4, 5, 6, 7 and 8, maximum value of P which can be configured by the gNB is 8 and hence X=1024*8=8192. Note that the gNB may configure a value less than maximum value that can be configured but X is based on the maximum value i.e. X=1024*8=8192.

In an alternate embodiment, X=Max value of N which can be configured by the gNB*Max value of Ns which can be configured by the gNB*Max value of P which can be configured by the gNB.

In an alternate embodiment, X=N*Ns*P.

If the UE identity based paging grouping or subgrouping is not supported in the cell ('No' in step 405), in step 407, the UE may then use the determined first UE_ID to determine PF and PO for monitoring early paging indication and/or paging DCI.

If the UE identity based paging grouping or subgrouping is supported in the cell ('Yes' in step 405), in step 411, the UE may then use the determined first UE_ID to determine PF and PO for monitoring early paging indication and/or paging DCI.

The PF for the UE is the radio frame with system frame number 'SFN' which satisfies the equation (SFN+ PF_offset) mod T=(T div N)*(First_UE_ID mod N).

Index (i_s), indicating the index of the PO is determined by i_s=floor(First_UE_ID/N) mod Ns.

If UE identity based paging grouping or subgrouping is supported in the cell (or parameter P is signaled), for monitoring paging using the UE identity based paging grouping or subgrouping, in step 413, the UE may use the determined second UE_ID to determine paging group or subgroup ID of the UE for monitoring early paging indication and/or paging DCI.

Paging group or subgroup ID=(Second_UE_ID/(N*Ns)) mod P.

T is DRX cycle of the UE.

In RRC_INACTIVE state, T is determined by the shortest of the UE specific DRX value configured by the RRC, UE specific DRX value configured by the NAS, and a default DRX value broadcast in system information.

In RRC_IDLE state, T is determined by the shortest of UE specific DRX value configured by the NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by the gNB.

When SearchSpaceId=0 is configured for paging-SearchSpace, the PDCCH monitoring occasions for paging are the same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE may monitor the (i_s+1)$^{th}$ PO. The PDCCH monitoring occasions for paging are determined based on paging search space configuration (paging-SearchSpace) signaled by the gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the (i_s+1)$^{th}$ PO is a set of 'S' consecutive PDCCH monitoring occasions for paging starting from the PDCCH monitoring occasion number indicated by firstPDCCH-MonitoringOccasionOfPO (i.e. the (i_s+1)$^{th}$ value of the firstPDCCH-MonitoringOccasion-OfPO parameter). Otherwise, the (i_s+1)$^{th}$ PO is a set of 'S' consecutive PDCCH monitoring occasions for paging starting from the (i_s*S)$^{th}$ PDCCH monitoring occasion for paging. 'S' is the number of actual transmitted SSBs determined according to parameter ssb-PositionsInBurst signalled in SystemInformation-Block1 received from the gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If early paging indication is supported, the UE may check whether paging group or subgroup associated with the UE is indicated by early paging indication or not. If indicated, the UE may monitor paging DCI in the PO associated with the early paging indication.

If the paging DCI indicates paging group(s) or subgroup(s), the UE may check whether the paging group or subgroup associated with the UE is indicated by the paging DCI or not. If the paging group or subgroup of the UE is indicated in the paging DCI, the UE may receive and decode the PDSCH scheduled by the paging DCI to receive the paging message.

Note that similar method is also applied at the gNB side to determine PF/PO and the paging group or subgroup ID of the UE based on UE identity.

Embodiment 4

FIG. 5 illustrates a flow chart describing UE operation according to an embodiment.

In step 501, the UE may receive paging configuration information about the number of paging frames (N), number of paging occasions per paging frame (Ns) and number of paging groups or subgroups based on UE identity (P) from gNB. The paging configuration information can be received in SIB (e.g. SIB1) or in the RRC signaling message (such as RRCReconfiguration message, or RRCRelease message). In this embodiment, it is assumed that UE supports UE identity based paging grouping or subgrouping. It is also assumed that UE is not assigned CN based paging grouping or subgrouping or camped cell does not support CN based paging grouping or subgrouping.

In step 503, the UE may determine First_UE_ID as follows.

First_UE_ID=5G-S-TMSI mod 1024.

In step 505, the UE may determine whether the UE identity based paging grouping (or paging sub grouping) is supported in the cell (or parameter P is signaled) or not. In an alternate embodiment, the UE may determine whether the early paging indication is supported in the cell or not.

If UE identity based paging grouping or subgrouping is supported in cell (or parameter P is signaled) for monitoring paging using UE identity based paging grouping or sub-grouping ('Yes' in step 505), in step 507, the UE may determine whether a multiplication of the parameter N, the parameter Ns and the parameter P is greater than 1024.

If N*Ns*P>1024('Yes' in step 507), in step 509, the UE may determine Second_UE_ID as follows.

Second_UE_ID=5G-S-TMSI mod X.

In an embodiment, X is pre-defined and has a value greater than 1024.

In an alternate embodiment, X=1024*P.

In an alternate embodiment, X=1024*Max value of P which can be configured by gNB. For example, if configurable values of P are 2, 4, 8, 16, max value of P which can be configured by gNB is 16 and X=1024*16. Similarly, if maximum value of P which can be configured by the gNB is 8, X=1024*8=8192. If configurable values of P are 1, 2, 3, 4, 5, 6, 7, and 8, the maximum value of P which can be configured by the gNB is 8 and hence X=1024*8=8192. Note that the gNB may configure a value less than the maximum value that can be configured but X is based on maximum value i.e. X=1024*8=8192.

In an alternate embodiment, X=Max value of N which can be configured by gNB*Max value of Ns which can be configured by gNB*Max value of P which can be configured by gNB.

In an alternate embodiment, X=N*Ns*P.

If the paging grouping or subgrouping is not supported in the cell ('No' in step 505), the UE may use First_UE_ID determined in step 503 to determine PF and PO for monitoring early paging indication or paging DCI.

If N*Ns*P is less than or equal to 1024 ('No' in step 507), in step 513, the UE may determine Second_UE_ID as follows.

Second_UE_ID=First_UE_ID=5G-S-TMSI mod 1024.

In step 515, the UE may then use the determined first UE_ID determine PF and PO for monitoring early paging indication and/or paging DCI.

The PF for a UE is the radio frame with system frame number 'SFN' which satisfies the equation (SFN+ PF_offset) mod T=(T div N)*(First_UE_ID mod N).

Index (i_s), indicating the index of the PO is determined by i_s=floor(First_UE_ID/N) mod Ns.

If UE identity based paging grouping is supported in cell (or parameter P is signaled), for monitoring paging using UE identity based paging grouping, in step 517, the UE may use the determined second UE_ID to determine UE group ID for monitoring early paging indication and/or paging DCI as follows.

UE group ID=(Second_UE_ID/(N*Ns)) mod P

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformation-Block1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If early paging indication is supported, UE checks whether its group is indicated by early paging indication or not. If indicated, UE monitors paging DCI in its PO.

If paging DCI indicates paging group(s) or subgroup(s), UE checks whether its paging group or subgroup is indicated by paging DCI or not. If the paging group or subgroup of the UE is indicated in paging DCI, UE receives and decoded the PDSCH scheduled by paging DCI to receive paging message.

Note that similar method is also applied at the gNB side to determine PF/PO and paging group or subgroup ID of the UE based on UE identity.

Embodiment 5

FIG. 6 illustrates a flow chart describing UE operation according to an embodiment.

In step 601, the UE may receive paging configuration information about the number of paging frames (N), number of paging occasions per paging frame (Ns) and number of paging groups or subgroups based on UE identity (P) from gNB. The paging configuration information can be received in SIB (e.g. SIB1) or in RRC signaling message (such as RRCReconfiguration message, or RRCRelease message). In this embodiment, it is assumed that UE supports UE identity based paging grouping or subgrouping. It is also assumed that UE is not assigned CN based paging grouping or subgrouping or camped cell does not support CN based paging grouping or subgrouping.

In step 603, the UE may determine First_UE_ID, as follows.

First_UE_ID=5G-S-TMSI mod 1024. (In this embodiment, the UE may use the determined first UE_ID to determine PF and PO for monitoring early paging indication and/or paging DCI).

In step 605, the UE may determine whether the UE identity based paging grouping (or paging sub grouping) is supported in the cell (or parameter P is signaled) or not. In an alternate embodiment, the UE may determine whether the early paging indication is supported in the cell or not.

If UE identity based paging grouping or subgrouping is supported in cell (or parameter P is signaled), for monitoring paging using UE identity based paging grouping or subgrouping ('Yes' in step 605), in step 607, the UE determine second UE_ID to determine UE group ID for monitoring early paging indication and/or paging DCI as follows.

Second_UE_ID=5G-S-TMSI.

If the UE identity based paging grouping is not supported in the cell ('No' in step 605), the UE may use First_UE_ID to determine PF and PO for monitoring early paging indication or paging DCI.

If the UE identity based paging grouping is supported in the cell ('Yes' in step 605), in step 611, after determining the Second_UE_ID, the UE may then use the determined first UE_ID to determine PF and PO for monitoring early paging indication and/or paging DCI.

The PF for a UE is the radio frame with system frame number 'SFN' which satisfies the equation (SFN+PF_offset) mod T=(T div N)*(First_UE_ID mod N).

Index (i_s), indicating the index of the PO is determined by i_s=floor(First_UE_ID/N) mod Ns.

If UE identity based paging grouping is supported in cell (or parameter P is signaled), for monitoring paging using UE identity based paging grouping or subgrouping, in step 613, the UE may use the determined second UE_ID to determine paging group or subgroup ID of the UE for monitoring early paging indication and/or paging DCI.

paging group or subgroup ID=(Second_UE_ID/(N*Ns)) mod P

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformationBlock1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If early paging indication is supported, UE checks whether its paging group or subgroup is indicated by early paging indication or not. If indicated, UE monitors paging DCI in its PO.

If paging DCI indicates paging group(s) or subgroup(s), UE checks whether its paging group or subgroup is indicated by paging DCI or not. If paging group or subgroup of the UE is indicated in paging DCI, UE receives and decoded the PDSCH scheduled by paging DCI to receive paging message.

Note that similar method is also applied at the gNB side to determine PF/PO and paging group or subgroup ID of the UE based on UE_ID.

UE_ID and Extended DRX Cycle

Embodiment 1

FIG. 7 illustrates a flow chart describing UE operation according to an embodiment.

In step 701, the UE may receive paging configuration information from gNB. The paging configuration information can be received in SIB (e.g. SIB1) or in the RRC signaling message (such as RRCReconfiguration message, or RRCRelease message).

The paging configuration includes information about the number of paging frames (N), number of paging occasions per paging frame (Ns) and number of paging groups or subgroups based on UE identity (P) from the gNB. Extended DRX cycle can be configured by RRC signalling or NAS signalling. System information (i.e. SIB) may indicate whether extended DRX cycle is allowed (i.e. can be applied) in the camped cell.

In step 703, the UE may check whether DRX cycle length >256 (or if N*Ns>1024 or extended DRX cycle is configured and can be applied by the UE for paging monitoring) or not.

If DRX cycle length >256 (or if N*Ns>1024 or extended DRX cycle is configured and can be applied by UE for paging monitoring) ('Yes' in step 703), in step 705, the UE may determine UE_ID as follows.

UE_ID=5G-S-TMSI mod X1.

In an embodiment, X1=4096.

In an alternate embodiment, X1=1024*DRX cycle length/256.

In an alternate embodiment, X1=Max value of N which can be configured by the gNB*Max value of Ns which can be configured by the gNB.

In an alternate embodiment, X1=N*Ns.

If DRX cycle length is less than or equal to 256 (or if N*Ns is less than or equal to 1024 or extended DRX cycle is not configured or extended DRX cycle cannot be applied by UE for paging monitoring) ('No' in step 703), in step 707, the UE may determine UE_ID as follows.

UE_ID=5G-S-TMSI 1024.

In an embodiment, DRX cycle length in above operation is default DRX cycle length. In another embodiment, DRX cycle length is the value of T determined as explained later. In an embodiment, DRX cycle length in above operation is UE specific DRX cycle length; if multiple UE specific DRX cycle lengths are there, DRX cycle length in above operation is minimum of them.

In step 709, the UE may then use the determined UE_ID to further determine PF and PO for monitoring early paging indication and/or paging DCI.

The PF for a UE is the radio frame with system frame number 'SFN' which satisfies the equation (SFN+ PF_offset) mod T=(T div N)*(UE_ID mod N).

Index (i_s), indicating the index of the PO is determined by i_s=floor(UE_ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

In an embodiment, if UE specific DRX cycle length >256, T is the UE specific DRX cycle length.

N: number of total paging frames in T.

Ns: number of paging occasions for a PF.

PF_offset: offset used for PF determination.

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasion-OfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformation-Block1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

Note that similar method is also applied at the gNB side to determine PF/PO.

Embodiment 2

The UE may receive paging configuration information from gNB. The paging configuration information can be received in SIB (e.g. SIB1) or in RRC signaling message (such as RRCReconfiguration message, or RRCRelease message). The paging configuration includes information about the number of paging frames (N), number of paging occasions per paging frame (Ns) and number of paging groups or subgroups based on UE identity (P) from the gNB.

Extended DRX cycle can be configured by RRC signalling or NAS signalling. System information (i.e. SIB) may indicate whether extended DRX cycle is allowed (i.e. can be applied) in the camped cell. UE supporting UE identity based paging subgrouping uses UE identity based paging subgrouping for paging monitoring in camped cell, if all of the following conditions (A, B) are met:

A) camped cell supports UE identity based paging subgrouping

B) UE is not assigned CN based paging subgroup or camped cell does not support CN based paging subgrouping.

The UE may check whether DRX cycle length >256 (or if N*Ns>1024 or eDRX is configured) or not.

If DRX cycle length >256 (or N*Ns>1024 or eDRX is configured or extended DRX cycle is configured and can be applied by UE for paging monitoring), the UE may determine whether the UE identity based paging subgrouping is supported. (i.e. UE determine whether it needs to use UE identity based paging subgrouping for paging monitoring)

If paging sub grouping is not supported, the UE may determine UE_ID as follows.

UE_ID=5G-S-TMSI mod X1.

In an embodiment, X1=4096.

In an alternate embodiment, X1=1024*DRX cycle length/256.

In an alternate embodiment, X 1=Max value of N which can be configured by gNB*Max value of Ns which can be configured by gNB.

In an alternate embodiment, X1=N*Ns.

UE_ID is used for PF/PO determination.

If paging subgrouping is supported (i.e. if UE use UE identity based paging subgrouping for paging monitoring), the UE may determine UE_ID according to following options.

Option 1:

The UE may determine whether a multiplication of the parameter N, the parameter Ns and the parameter P is greater than 4096.

If N*Ns*P>4096, the UE may determine UE_ID as follows.

UE_ID=5G-S-TMSI mod X2.

In an embodiment, X2 is pre-defined and has a value greater than 4096.

In an alternate embodiment, X2=4096*P.

In an alternate embodiment, X2=4096*Max value of P which can be configured by gNB. For example, if config-urable values of P are 2, 4, 8, 16, max value of P which can be configured by gNB is 16 and hence X2=4096*16. Note that the gNB can set the value of P to 2 or 4 or 8 or 16, but X2=4096*16. Similarly if the maximum value of P which can be configured by gNB is 8, X2=4096*8=32768. Note that the gNB may configure a value less than maximum value that can be configured. If configurable values of P are 1, 2, 3, 4, 5, 6, 7, and 8, the maximum value of P which can be configured by the gNB is 8 and hence X2=4096*8=32768. Note that the gNB may configure a value less than maximum value that can be configured but X is based on maximum value i.e. X2=4096*8=32768.

In an alternate embodiment, X2=Max value of N which can be configured by gNB*Max value of Ns which can be configured by gNB*Max value of P which can be configured by gNB.

In an alternate embodiment, X2=N*Ns*P.

If N*Ns*P is less than or equal to 4096, the UE may determine UE_ID as follows.

UE_ID=5G-S-TMSI mod X1.

In an embodiment, X1=4096.

In an alternate embodiment, X1=1024*DRX cycle length/256.

In an alternate embodiment, X 1=Max value of N which can be configured by gNB*Max value of Ns which can be configured by gNB.

In an alternate embodiment, X1=N*Ns.

Determined UE_ID is used for PF/PO and paging group or subgroup ID determination.

Option 2:

UE_ID=5G-S-TMSI mod X2.

In an embodiment, X2 is pre-defined and has a value greater than 4096.

In an alternate embodiment, X2=4096*P.

In an alternate embodiment, X2=4096*Max value of P which can be configured by gNB. For example, if config-urable values of P are 2, 4, 8, 16, max value of P which can be configured by gNB is 16 and hence X2=4096*16. Similarly, if the maximum value of P which can be configured by gNB is 8, X2=4096*8=32768. If configurable values of P are 1, 2, 3, 4, 5, 6, 7, and 8, the maximum value of P which can be configured by the gNB is 8 and hence X2=4096*8=32768. Note that gNB may configure a value less than the maximum value that can be configured but X is based on maximum value i.e. X2=4096*8=32768.

In an alternate embodiment, X2=Max value of N which can be configured by gNB*Max value of Ns which can be configured by gNB*Max value of P which can be configured by gNB.

In an alternate embodiment, X2=N*Ns*P.

Determined UE_ID is used for PF/PO and UE group ID determination

Option 3:

The UE may determine First_UE_ID as follows.

First_UE_ID=5G-S-TMSI mod X1.

In an embodiment, X1=4096.

In an alternate embodiment, X1=1024*DRX cycle length/256.

In an alternate embodiment, X 1=Max value of N which can be configured by gNB*Max value of Ns which can be configured by gNB.

In an alternate embodiment, X1=N*Ns.

The UE may determine Second_UE_ID as follows.

Second_UE_ID=5G-S-TMSI mod X2.

In an embodiment, X2 is pre-defined and has a value greater than 4096.

In an alternate embodiment, X2=4096*P.

In an alternate embodiment, X2=4096*Max value of P which can be configured by gNB. For example, if config-urable values of P are 2, 4, 8, 16, max value of P which can be configured by gNB is 16 and hence X2=4096*16. Simi-larly, if the maximum value of P which can be configured by gNB is 8, X2=4096*8=32768. If configurable values of P are 1, 2, 3, 4, 5, 6, 7, and 8, the maximum value of P which can be configured by the gNB is 8 and hence X2=4096*8=32768. Note that the gNB may configure a value less than maximum value that can be configured but X is based on maximum value i.e. X2=4096*8=32768.

In an alternate embodiment, X2=Max value of N which can be configured by gNB*Max value of Ns which can be configured by gNB*Max value of P which can be configured by gNB.

In an alternate embodiment, X2=N*Ns*P.

First_UE_ID is used for PF and PO determination and Second_UE_ID is used for paging group or subgroup ID determination.

Option 4:

The UE may determine First_UE_ID as follows.

First_UE_ID=5G-S-TMSI mod X1.

In an embodiment, X1=4096.

In an alternate embodiment, X1=1024*DRX cycle length/256.

In an alternate embodiment, X 1=Max value of N which can be configured by gNB*Max value of Ns which can be configured by gNB.

In an alternate embodiment, X1=N*Ns.

The UE may determine whether a multiplication of the parameter N, the parameter Ns and the parameter P is greater than 4096.

If N*Ns*P>4096, the UE may determine Second_UE_ID as follows.

Second_UE_ID=5G-S-TMSI mod X2.

In an embodiment, X2 is pre-defined and has a value greater than 4096.

In an alternate embodiment, X2=4096*P.

In an alternate embodiment, X2=4096*Max value of P which can be configured by gNB. For example, if configurable values of P are 2, 4, 8, 16, max value of P which can be configured by gNB is 16 and hence X2=4096*16. Similarly, if the maximum value of P which can be configured by gNB is 8, X2=4096*8=32768. If configurable values of P are 1, 2, 3, 4, 5, 6, 7, and 8, the maximum value of P which can be configured by the gNB is 8 and hence X2=4096*8=32768. Note that gNB may configure a value less than maximum value that can be configured but X is based on maximum value i.e. X2=4096*8=32768.

In an alternate embodiment, X2=Max value of N which can be configured by gNB*Max value of Ns which can be configured by gNB*Max value of P which can be configured by gNB.

In an alternate embodiment, X2=N*Ns*P.

If N*Ns*P is less than or equal to 4096, the UE may determine Second UE_ID as follows.

Second_UE_ID=First_UE_ID.

First_UE_ID is used for PF and PO determination and Second_UE_ID is used for paging group or subgroup ID determination.

Option 5:

The UE may determine First_UE_ID as follows.

First_UE_ID=5G-S-TMSI mod X1.

In an embodiment, X1=4096.

In an alternate embodiment, X1=1024*DRX cycle length/256.

In an alternate embodiment, X 1=Max value of N which can be configured by gNB*Max value of Ns which can be configured by gNB.

In an alternate embodiment, X1=N*Ns.

The UE may determine Second_UE_ID as follows.

Second_UE_ID=5G-S-TMSI.

First_UE_ID is used for PF and PO determination and Second_UE_ID is used for group ID determination If DRX cycle length is less than or equal to 256 (or N*Ns is less than or equal to 1024 or eDRX is not configured or extended DRX cycle is not configured or extended DRX cycle cannot be applied by UE for paging monitoring), the UE may determine whether the paging subgrouping is supported.

If paging sub grouping is not supported (i.e. if UE does not use UE identity based paging subgrouping for paging monitoring), the UE may determine UE_ID as follows.

UE_ID=5G-S-TMSI mod 1024.

UE_ID is used for PF/PO determination

If paging sub grouping is supported (i.e. if UE use UE identity based paging subgrouping for paging monitoring), the UE may determine UE_ID according to the following options.

Option 1:

The UE may determine whether a multiplication of the parameter N, the parameter Ns and the parameter P is greater than 1024.

If N*Ns*P>1024, the UE may determine UE_ID as follows.

UE_ID=5G-S-TMSI mod X2.

In an embodiment, X2 is pre-defined and has a value greater than 1024.

In an alternate embodiment, X2=1024*P.

In an alternate embodiment, X2=1024*Max value of P which can be configured by gNB. For example, if configurable values of P are 2, 4, 8, 16, max value of P which can be configured by gNB is 16 and hence X2=1024*16. Similarly, if the maximum value of P which can be configured by gNB is 8, X2=1024*8=8192.

In an alternate embodiment, X2=Max value of N which can be configured by gNB*Max value of Ns which can be configured by gNB*Max value of P which can be configured by gNB.

In an alternate embodiment, X2=N*Ns*P.

If N*Ns*P is less than or equal to 1024, the UE may determine UE_ID as follows.

UE_ID=5G-S-TMSI mod 1024.

UE_ID is used for PF/PO and paging group or subgroup ID determination.

Option 2:

The UE may determine UE_ID as follows.

UE_ID=5G-S-TMSI mod X2.

In an embodiment, X2 is pre-defined and has a value greater than 1024.

In an alternate embodiment, X2=1024*P.

In an alternate embodiment, X2=1024*Max value of P which can be configured by gNB. For example, if configurable values of P are 2, 4, 8, 16, max value of P which can be configured by gNB is 16 and hence X2=1024*16. Similarly, if the maximum value of P which can be configured by gNB is 8, X2=1024*8=8192.

In an alternate embodiment, X2=Max value of N which can be configured by gNB*Max value of Ns which can be configured by gNB*Max value of P which can be configured by gNB.

In an alternate embodiment, X2=N*Ns*P.

UE_ID is used for PF/PO and paging group or subgroup ID determination.

Option 3:

The UE may determine First_UE_ID and Second_UE_ID as follows.

First_UE_ID=5G-S-TMSI mod 1024.

Second_UE_ID=5G-S-TMSI mod X2.

In an embodiment, X2 is pre-defined and has a value greater than 1024;

In an alternate embodiment, X2=1024*P;

In an alternate embodiment, X2=1024*Max value of P which can be configured by gNB. For example, if configurable values of P are 2, 4, 8, 16, max value of P which can be configured by gNB is 16 and hence X2=1024*16. Similarly, if the maximum value of P which can be configured by gNB is 8, X2=1024*8=8192.

In an alternate embodiment, X2=Max value of N which can be configured by gNB*Max value of Ns which can be configured by gNB*Max value of P which can be configured by gNB In an alternate embodiment, X2=N*Ns*P First_UE_ID is used for PF and PO determination and Second_UE_ID is used for group ID determination.

Option 4:

The UE may determine First_UE_ID as follows.

First_UE_ID=5G-S-TMSI mod 1024.

The UE may determine whether a multiplication of the parameter N, the parameter Ns and the parameter P is greater than 1024.

If N*Ns*P>1024, the UE may determine Second_UE_ID as follows.

Second_UE_ID=5G-S-TMSI mod X2.

In an embodiment, X2 is pre-defined and has a value greater than 1024.

In an alternate embodiment, X2=1024*P.

In an alternate embodiment, X2=1024*Max value of P which can be configured by gNB. For example, if configurable values of P are 2, 4, 8, 16, max value of P which can be configured by gNB is 16 and hence X2=1024*16. Similarly, if the maximum value of P which can be configured by gNB is 8, X2=1024*8=8192.

In an alternate embodiment, X2=Max value of N which can be configured by gNB*Max value of Ns which can be configured by gNB*Max value of P which can be configured by gNB.

In an alternate embodiment, X2=N*Ns*P.

If N*Ns*P is less than or equal to 1024, the UE may determine Second UD ID as follows.

Second_UE_ID=First_UE_ID.

First_UE_ID is used for PF and PO determination and Second_UE_ID is used for paging group or subgroup ID determination.

Option 5:

The UE may determine First_UE_ID and Second_UE_ID as follows.

First_UE_ID=5G-S-TMSI mod 1024.

Second_UE_ID=5G-S-TMSI.

First_UE_ID is used for PF and PO determination and Second_UE_ID is used for group ID determination.

In an embodiment, DRX cycle length in above operation is default DRX cycle length. In another embodiment, DRX cycle length is the value of T determined as explained later.

In an embodiment, DRX cycle length in above operation is UE specific DRX cycle length; if multiple UE specific DRX cycle lengths are there, DRX cycle length in above operation is minimum of them.

SDT Trigger Considering SRB

Embodiment 1

Data volume threshold is applied to both SRB and DRB

One or more RBs (SRB and/or DRB) for which SDT is enabled is signaled by gNB

If data becomes available for only those RB(s) for which SDT is enabled and cumulative volume of data available for SDT RB(s) is less than a threshold (RB can be SRB or DRB)

SDT procedure is initiated, provided SDT resources are configured and other criteria (if any, such as RSRP threshold) are met Else SDT procedure is not initiated

Embodiment 2

Data volume threshold is applied only to DRB

One or more RBs (SRB and/or DRB) for which SDT is enabled is signaled by gNB

If data becomes available for SRB for which SDT is enabled (or upon initiation of transmission of signaling message corresponding to a SRB for which SDT is enabled); or If data becomes available for DRB(s) for which SDT is enabled and cumulative volume of data available for SDT RB(s) is less than a threshold and data is not available for non SDT DRB(s):

SDT procedure is initiated, provided SDT resources are configured and other criteria (if any, such as RSRP threshold) are met Else SDT procedure is not initiated

Embodiment 3

One or more RBs (SRB and/or DRB) for which SDT is enabled is signaled by gNB

If a specific signaling message is initiated and this message is mapped to SRB for which SDT is enabled; or If data becomes available for DRB(s) for which SDT is enabled and cumulative volume of data available for SDT RB(s) is less than a threshold and data is not available for non SDT DRB(s):

SDT procedure is initiated, provided SDT resources are configured and other criteria (if any, such as RSRP threshold) are met Else SDT procedure is not initiated In an embodiment, specific signaling message can be NAS message. In another embodiment, it can be NAS message related to positioning. In another embodiment it can be RRC message.

In accordance with an embodiment of the disclosure, a method performed by a user equipment (UE) in a wireless communication system is provided. The method may comprise: receiving, from a base station, paging early indication (PEI) configuration information including a parameter indicating a number of UE identity (ID) based paging subgroups; determining a paging subgroup ID corresponding to the UE, based on a maximum value of the parameter; monitoring PEI information on a PEI occasion, based on the PEI configuration information; and in case that the PEI information indicates the paging subgroup ID, monitoring paging downlink control information (DCI) on a paging occasion (PO).

In an embodiment, wherein the method may further comprise: determining a first UE ID, based on a 5G-S-Temporary Mobile Subscription Identifier (5G-S-TMSI) and a predetermined value; and determining the PO, based on the first UE_ID.

In an embodiment, wherein the determining of the paging subgroup ID comprises: determining a second UE_ID, based on a 5G-S-TMSI and a multiplication of a predetermined value and the maximum value; and determining the paging subgroup ID, based on the second UE_ID.

In an embodiment, wherein the predetermined value is equal to 1024, and wherein the maximum value is equal to 8.

In an embodiment, wherein the paging subgroup ID corresponds to a plurality of UEs configured to monitor the same paging occasion (PO).

In an embodiment, wherein the maximum value is configured by the base station.

In an embodiment, wherein the paging subgroup ID corresponds to a plurality of UEs configured to monitor the same paging occasion (PO).

In an embodiment, wherein the PEI configuration information is received via a radio resource control (RRC) message.

In an embodiment, wherein the UE is in a cell supporting a subgrouping based on a UE_ID.

In accordance with an embodiment of the disclosure, a user equipment (UE) in a wireless communication system is provided. The UE may comprise: a transceiver; and at least one processor coupled to the transceiver and configured to: receive, from a base station via the transceiver, paging early indication (PEI) configuration information including a parameter indicating a number of UE identity (ID) based paging subgroups; determine a paging subgroup ID corresponding to the UE, based on a maximum value of the parameter; monitor, via the transceiver, PEI information on a PEI occasion, based on the PEI configuration information; and in case that the PEI information indicates the paging subgroup ID, monitoring, via the transceiver, paging downlink control information (DCI) on a paging occasion (PO).

In an embodiment, wherein the at least one processor is further configured to: determine a first UE_ID, based on a 5G-S-Temporary Mobile Subscription Identifier (5G-S-TMSI) and a predetermined value; and determine the PO, based on the first UE ID.

In an embodiment, wherein the at least one processor is further configured to: determine a second UE_ID, based on a 5G-S-TMSI and a multiplication of a predetermined value and the maximum value; and determine the paging subgroup ID, based on the second UE_ID.

In an embodiment, wherein the predetermined value is equal to 1024, and wherein the maximum number of subgroups is equal to 8.

In an embodiment, wherein the paging subgroup ID corresponds to a plurality of UEs configured to monitor the same paging occasion (PO).

In an embodiment, wherein the maximum value is configured by the base station.

In an embodiment, wherein the PEI configuration information is received via a radio resource control (RRC) message.

In accordance with an embodiment of the disclosure, a method performed by a base station in a wireless communication system is provided. The method may comprise: transmitting, to a user equipment (UE), paging early indication (PEI) configuration information including a parameter indicating a number of UE identity (ID) based paging subgroups; determining a paging subgroup identity (ID) corresponding to the UE, based on a maximum value of the parameter; transmitting, to the UE, PEI information indicating the paging subgroup ID; and transmitting, to the UE, paging downlink control information (DCI), based on the PEI information.

FIG. 8 is a diagram illustrating a UE 800 according to an embodiment of the present disclosure.

Referring to the FIG. 8, the UE 800 may include a processor 810, a transceiver 820 and a memory 830. However, all of the illustrated components are not essential. The UE 800 may be implemented by more or less components than those illustrated in the FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the UE 800 may be implemented by the processor 810.

The transceiver 820 may be connected to the processor 810 and transmit and/or receive a signal. In addition, the transceiver 820 may receive the signal through a wireless channel and output the signal to the processor 810. The transceiver 820 may transmit the signal output from the processor 810 through the wireless channel.

The memory 830 may store the control information or the data included in a signal obtained by the UE 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

FIG. 9 is a diagram illustrating a base station 900 according to an embodiment of the present disclosure.

Referring to the FIG. 9, the base station 900 may include a processor 910, a transceiver 920 and a memory 930. However, all of the illustrated components are not essential. The base station 900 may be implemented by more or less components than those illustrated in FIG. 9. In addition, the processor 910 and the transceiver 920 and the memory 930 may be implemented as a single chip according to another embodiment. The aforementioned components will now be described in detail.

The processor 910 may include one or more processors or other processing devices that control the proposed function, process, and/or method. Operation of the base station 900 may be implemented by the processor 910.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the base station 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a user equipment (UE) in a wireless communication system, the method comprising:

receiving, from a base station, system information including configuration information, the configuration information including paging information on a number of paging subgroups;

determining a UE identifier (ID), based on a 5G-S-Temporary Mobile Subscription Identifier (5G-S-TMSI) and an integer value greater than 1024, wherein the integer value is a multiple of a maximum number of paging subgroups configurable by the base station, the maximum number of paging subgroups being greater than or equal to the number of paging subgroups configured by the base station;

determining a paging subgroup ID of the UE, based on the UE ID and the paging information;

monitoring a paging early indication (PEI) occasion for reception of a PEI from the base station;

identifying that the PEI indicates a paging subgroup associated with the paging subgroup ID; and based on identifying that the PEI indicates the paging subgroup, monitoring a paging occasion (PO) for reception of paging downlink control information (DCI) from the base station.

2. The method of claim 1, wherein the UE ID is determined, based on a modulo operation of the 5G-S-TMSI and the integer value.

3. The method of claim 1, wherein the integer value is equal to 8192.

4. The method of claim 1, wherein the integer value is equal to 32768 in case that an extended discontinuous reception (eDRX) is applied.

5. The method of claim 1, wherein the maximum number of paging subgroups is equal to 8.

6. The method of claim 1, further comprising:

determining the PO, based on a UE ID associated with the 5G-S-TMSI and a value equal to 1024 or 4096.

7. The method of claim 6, wherein the value is equal to 4096 in case that the UE operates in an eDRX.

8. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor to cause the UE to:

receive, from a base station, system information including configuration information, the configuration information including paging information on a number of paging subgroups, determine a UE identifier (ID), based on a 5G-S-Temporary Mobile Subscription Identifier (5G-S-TMSI) and an integer value greater than 1024, wherein the integer value is a multiple of a maximum number of paging subgroups configurable by the base station, the maximum number of paging subgroups being greater than or equal to the number of paging subgroups configured by the base station, determine a paging subgroup ID of the UE, based on the UE ID and the paging information, monitor a paging early indication (PEI) occasion for reception of a PEI from the base station, identify that the PEI indicates a paging subgroup associated with the paging subgroup ID, and based on identifying that the PEI indicates the paging subgroup, monitor a paging occasion (PO) for reception of paging downlink control information (DCI) from the base station.

9. The UE of claim 8, wherein the UE ID is determined, based on a modulo operation of the 5G-S-TMSI and the integer value.

10. The UE of claim 8, wherein the integer value is equal to 8192.

11. The UE of claim 8, wherein the integer value is equal to 32768 in case that an extended discontinuous reception (eDRX) is applied.

12. The UE of claim 8, wherein the maximum number of paging subgroups is equal to 8.

13. The UE of claim 8, wherein the UE is further caused to:

determine the PO, based on a UE ID associated with the 5G-S-TMSI and a value equal to 1024 or 4096.

14. The UE of claim 13, wherein the value is equal to 4096 in case that the UE operates in an eDRX.

15. One or more non-transitory computer-readable storage media storing computer-executable instructions that, when executed by at least one processor of a user equipment (UE), cause the UE to perform operations, the operations comprising:

receiving, from a base station, system information including configuration information, the configuration information including paging information on a number of paging subgroups;

determining a UE identifier (ID), based on a 5G-S-Temporary Mobile Subscription Identifier (5G-S-TMSI) and an integer value greater than 1024, wherein the integer value is a multiple of a maximum number of paging subgroups configurable by the base station, the maximum number of paging subgroups being greater than or equal to the number of paging subgroups configured by the base station;

determining a paging subgroup ID of the UE, based on the UE ID and the paging information;

monitoring a paging early indication (PEI) occasion for reception of a PEI from the base station;

identifying that the PEI indicates a paging subgroup associated with the paging subgroup ID; and based on identifying that the PEI indicates the paging subgroup, monitoring a paging occasion (PO) for reception of paging downlink control information (DCI) from the base station.

* * * * *